(12) United States Patent
Tasker

(10) Patent No.: US 6,785,239 B1
(45) Date of Patent: Aug. 31, 2004

(54) REDUCING DELAYS IN A COMMUNICATION NETWORK USING A RE-FRAGMENTATION PIPELINE

(75) Inventor: Michael Tasker, Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/322,907

(22) Filed: Jun. 1, 1999

(51) Int. Cl.[7] .............................. H04L 12/56; H04J 3/16; H04J 3/22; H04J 3/24; G06F 15/173; G06F 15/16

(52) U.S. Cl. ...................... 370/238; 370/389; 370/465; 370/474; 709/224; 709/230

(58) Field of Search .................................. 370/238, 347, 370/389, 395, 352, 401, 428, 392, 462, 463, 465, 397, 471, 473; 455/515; 709/203, 218, 225, 249

(56) References Cited

U.S. PATENT DOCUMENTS

| | | | | |
|---|---|---|---|---|
| 5,315,588 A | * | 5/1994 | Kajiwara et al. | 370/389 |
| 5,396,490 A | * | 3/1995 | White et al. | 370/474 |
| 5,455,917 A | * | 10/1995 | Holeman et al. | 395/287 |
| 5,490,140 A | | 2/1996 | Abensour et al. | |
| 5,511,122 A | * | 4/1996 | Atkinson | 380/25 |
| 5,539,734 A | | 7/1996 | Burwell et al. | |
| 5,555,266 A | * | 9/1996 | Buchholz et al. | 370/347 |
| 5,606,561 A | * | 2/1997 | Scheibel, Jr. et al. | 370/347 |
| 5,896,496 A | | 4/1999 | Suzuki | |
| 5,936,948 A | | 8/1999 | Sicher | |
| 5,946,670 A | | 8/1999 | Motohashi et al. | |
| 5,987,034 A | * | 11/1999 | Simon et al. | 370/465 |
| 5,999,524 A | | 12/1999 | Corbalis et al. | |
| 6,005,851 A | * | 12/1999 | Craddock et al. | 370/329 |
| 6,134,245 A | * | 10/2000 | Scarmalis | 370/474 |
| 6,208,650 B1 | * | 3/2001 | Hassell et al. | 370/392 |
| 6,229,823 B1 | * | 5/2001 | Scarmalis | 370/477 |
| 6,278,708 B1 | * | 8/2001 | Von Hammerstein et al. | 370/389 |
| 6,292,495 B1 | * | 9/2001 | Von Hammerstein et al. | 370/465 |
| 6,310,893 B1 | * | 10/2001 | Yuan et al. | 370/474 |
| 6,356,561 B1 | * | 3/2002 | Lau et al. | 370/462 |
| 6,373,838 B1 | * | 4/2002 | Law et al. | 370/352 |
| 6,430,196 B1 | * | 8/2002 | Baroudi | 370/466 |
| 6,449,276 B1 | * | 9/2002 | Subbiah et al. | 370/395 |
| 6,463,477 B1 | * | 10/2002 | Fontenot | 709/236 |

OTHER PUBLICATIONS

"Motorola Introduces Family of Voice Over IP Routers for Internet and Intranet Telephony," Press Release dated Oct. 1, 1997.

Motorola Launches Major Initiative for Real–Time Multimedia Solutions for Business Networks, Press Release dated Apr. 28, 1997.

"ECI Telematics Partners With MICOM To Send Voice/Fax Over Frame Relay/X.25 Networks," Press Release dated Feb. 12, 1996.

"Voice Over Frame Relay Implementation Agreement," FRF 11, Frame Relay Forum Technical Committee, May 1997.

"Frame Relay Fragmentation Implementation Agreement," FRF 12, Frame Relay Forum Technical Committee, Dec. 1997.

International Telecommunication Union (ITU) ITU–T, G.723.1, General Aspects of Digital Transmission Systems, Dual Rate Speech Coder for Multimedia Communications Transmitting at 5.3 and 6.3 kbit/s, (Mar. 1996).

(List continued on next page.)

Primary Examiner—Man Phan
(74) Attorney, Agent, or Firm—Blakely, Sokoloff, Taylor & Zafman LLP

(57) ABSTRACT

A method and apparatus are described to reduce delay in a communication network. A fragmentation unit re-assembles a packet received from a first data link. A refragmentation pipeline is coupled to the fragmentation unit to pipeline the re-assembled data for transmission to a second data link.

31 Claims, 4 Drawing Sheets

OTHER PUBLICATIONS

"The Frame Relay Forum User–to–Network Implementation Agreement (UNI), "FRF 1.1, Frame Relay Technical Committee, Jan. 19, 1996.

International Telecommunication Under (ITU), ITU–T, G.729. General Aspects of Digital Transmission systems, Coding of Speech at 8 Kbit/s Using Conjugate–Structure Algebraic–Excited Linear–Prediction (CS–ACELP) (Mar. 1996).

Frame Relay Specification with Extensions, Document No. 002–208966 Rev. 1.0 Published by Digital Equipment Cororation, Nothern Telecom, Inc., and StrataCom, Inc. (Sep. 18, 1997).

American National Standards Institute ("ANSI"), T1–606, Integrated Services Digital Network (ISDN)—Architectural Framework and Service Description for Frame–Relaying Bearer Services, 1990.

American National Standards Institute ("ANSI"), T1.617, Integrated Services Digital Network (ISDN)—Signaling Specification for Frame–Relay Bearer Service for Digital Subscriber Signaling System No. 1 (DSS1), 1991.

International Telecommunication Union (ITU), ITU–T, H.323, Series H. Audiovisual and Multimedia Systems, Infrastructure of Audiovisual Services—Systems and Terminal Equipment for Audiovisual Services, Packet–Based Multimedia Communications Systems. (Feb. 1996).

International Telecommunication Union (ITU). ITU–T, H.320. Series H: Audiovisual and Multimedia Systems, Infrastructure of Audiovisual Services—Systems and Terminal Equipment for Audiovidual Services, Narrow–Band Visual Telephones Systes and Terminal Equipment, (Jul. 1997).

* cited by examiner

US 6,785,239 B1

REDUCING DELAYS IN A COMMUNICATION NETWORK USING A RE-FRAGMENTATION PIPELINE

FIELD OF THE INVENTION

This invention relates to data communication. In particular, the invention relates to reducing delay in communication networks.

THE BACKGROUND OF THE INVENTION

A communication network is a collection of nodes to which communicating stations (e.g., computers, terminals) are attached. A node is essentially a switching device that moves the data from node to node until they reach the destination. There are two basic types of switching techniques: circuit switching and packet switching. Among the packet switching networks, frame relay has become popular recently.

Frame relay provides a packet-switching data communications capability that is used across the interface between user devices (e.g., routers, bridges, host machines) and network equipment (e.g., switching nodes). The network providing the frame relay interface (FRI) can be either a carrier-provided public network or a network of privately owned equipment serving a single enterprise.

As an interface between user and network equipment, frame relay provides a means for statistically multiplexing many logical data conversations (referred to as virtual circuits, or VC's) over a single physical transmission link. Frame relay's statistical multiplexing provides more flexible and efficient use of available bandwidth that time-division-multiplexing (TDM) techniques. Frame relay can be used without TDM techniques or on top of channels provided by TDM systems.

Voice Over Frame Relay (VoFR) as defined in the standard from the Frame Relay Forum (FRF) FRF.11, allows PBX's to be similarly connected using frame relay permanent virtual circuits (PVC's), replacing leased lines and lowering costs. In a multi-hop frame relay network using FRF.11 voice over frame relay, non-voice packets carried by the network are fragmented according to the FRF.12 specification. Non-voice packets may include real-time sensitive common channel signaling (CCS) packets used to setup and teardown voice calls that are being carried by the FRF.11 frame relay voice network (over a dedicated FRF.11 sub-channel) between two PBXs.

The problem with the current fragmentation and defragmentation schemes is delays in the processing of packets for transmission, especially when the fragmentation sizes between two data links are not the same. In a multi-hop network, each time a CCS packet arrives at a forwarding node, it is defragmented before it can be forwarded to the next hop. When the defragmented packet is forwarded, the FRF.11 frame relay link that it is forwarded into will require that the packet is fragmented again. In the general case, the fragmentation size on the two links may not be the same. The defragmentation followed by refragmentation process causes the packet to be delayed. This delay will accumulate for each FRF.11 hop added and may end up exceeding the timeout values for the PBXs communicating via the CCS protocol.

SUMMARY OF THE INVENTION

A method and apparatus are described to reduce delay in a communication network. A fragmentation unit re-assembles a packet received from a first data link. A refragmentation pipeline is coupled to the fragmentation unit to pipeline the re-assembled data for transmission to a second data link.

Other features and advantages of the invention will be apparent from the detailed description and drawings provided herein.

BRIEF DESCRIPTION OF THE DRAWINGS

The present invention is illustrated by way of example and not limitation in the figures of the accompanying drawings in which like references indicated similar elements in which.

DETAILED DESCRIPTION

A method and apparatus are described to reduce delays in a communication network. Packet data are received by a receive queue and transferred to a re-assembly buffer. A refragmentation pipeline removes data from the re-assembly buffer as soon as the data exceeds the fragmentation size. By pipelining the transfer of data, the delay is significantly reduced.

In the following description, a frame relay network is used merely as an exemplary embodiment. Other networks having similar characteristics regarding the pipeline architecture are also suitable embodiments.

Figure 1:
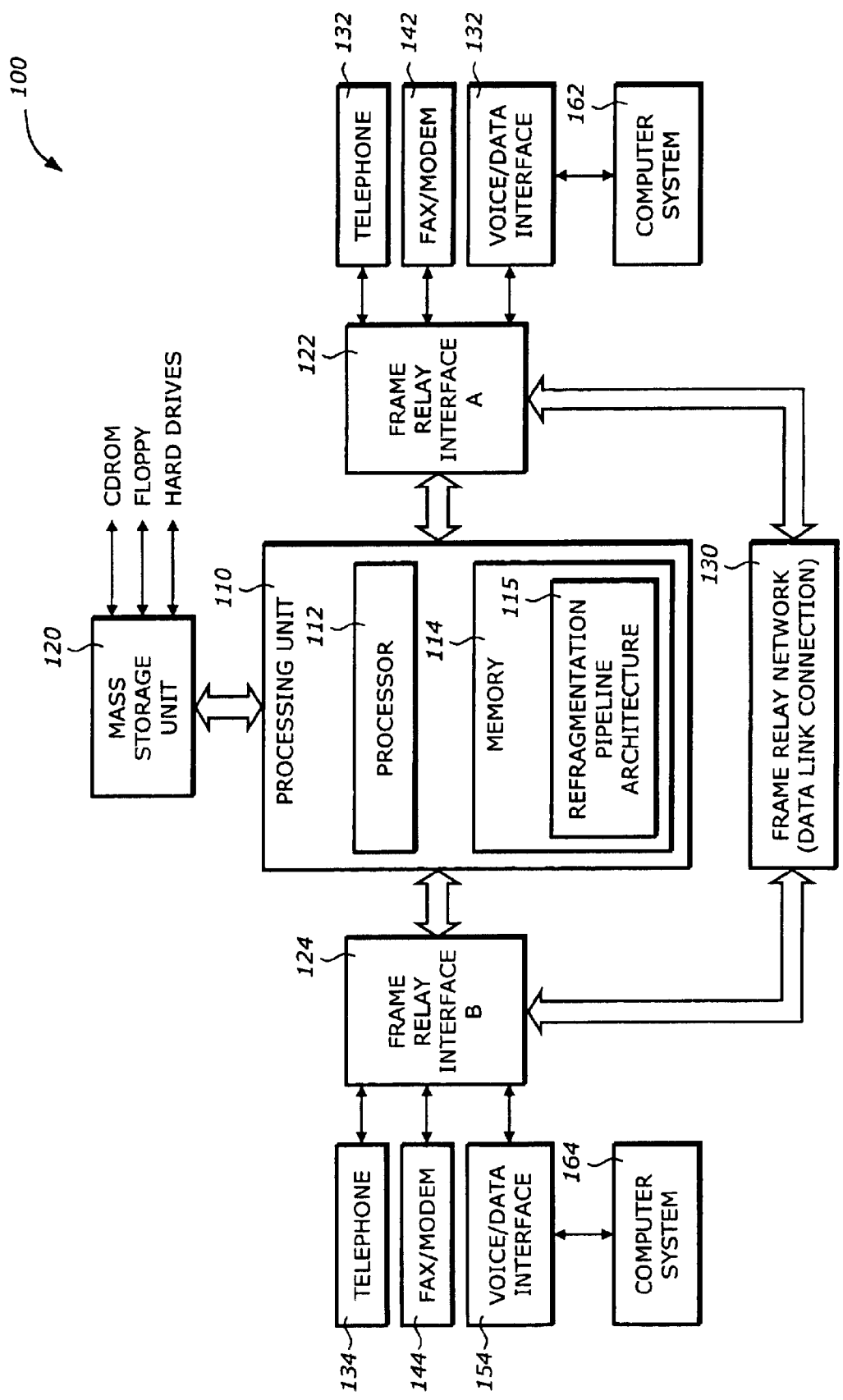
FIG. 1 shows a system in which one embodiment of the invention can be practiced.

FIG. 1 is a diagram illustrating a system 100 in which one embodiment of the invention can be practiced. The system 100 includes a processing unit 110, a mass storage unit 120, a frame relay interface (FRI) A (FRI A) 122, an FRI B 124, a frame relay network 130, an FRI A telephone 132, an FRI A fax/modem 142, an FRI A voice/data interface 152, an FRI A computer system 162, an FRI B telephone 134, an FRI B fax/modem 144, an FRI B voice/data interface 154, and an FRI B computer system 164.

The processing unit 110 includes a processor 112 and a memory 114. The processor 112 is any processor which can execute programs to process information. The memory 114 includes a re-fragmentation pipeline architecture (RPA) 115. The re-fragmentation pipeline architecture 115 may be implemented by hardware or software. In one embodiment, the RPA 115 includes program code segments that execute instructions from the processing unit. When implemented in software, the elements of the RPA 115 are essentially the code segments to perform re-fragmentation of data in a pipeline manner. The program or code segments can be stored in a processor readable medium. The "processor readable medium" may include any medium that can store or transfer information. Examples of the processor readable medium include an electronic circuit, a semiconductor memory device, a read-only memory (ROM), a flash memory, an erasable ROM (EROM), a floppy diskette, a compact disk (CD) ROM, an optical disk, a hard disk, a transmission medium, a fiber optic medium, a radio frequency (RF) link, etc.

The mass storage unit 120 includes any mass storage device that can store information in a non-volatile manner. The mass storage unit 120 interfaces to a number of mass storage media such as CDROM, floppy diskettes, and hard disk, etc. These mass storage media are also the processor readable media storing the program code segments for the RPA 115.

The FRI A 122 and FRI B 124 provide the interface to the data communication devices and the frame relay network 130. The FRI A 122 and FRI 124 may include router or multiplexer to connect to data communication devices or networks such as Ethernet.

The FRI A telephone 132, the FRI A fax/modem 142, the FRI A voice/data interface 152, the FRI A computer system 162, the FRI B telephone 134, the FRI B fax/modem 144, the FRI B voice/data interface 154, and the FRI B computer system 164 represent the data communication devices that transmit and receive voice and data information over the frame relay network 130.

The frame relay network 130 provides a network of communication such as Wide Area Network (WAN) to exchange information. The frame relay network 130 includes a number of data link connections identified by the corresponding data link connection identifiers (DTCI's) in the packets.

Figure 2:
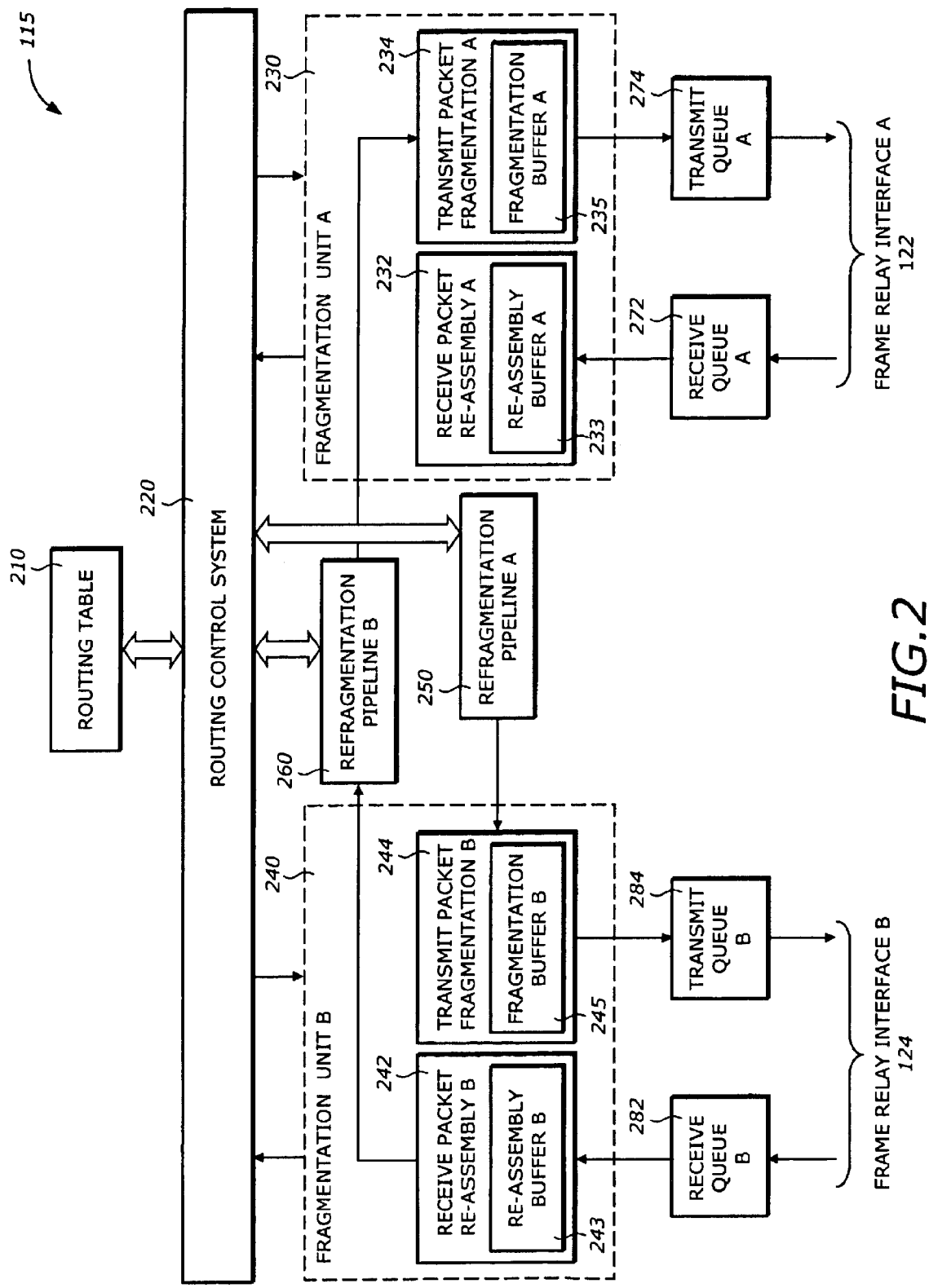
FIG. 2 shows a re-fragmentation pipeline architecture.

FIG. 2 is a diagram illustrating a re-fragmentation pipeline architecture 115 according to one embodiment of the invention. The RPA 115 includes a routing table 210, a routing control system 220, a fragmentation unit A 230, a receive queue A 272, a transmit queue A 274, a re-fragmentation pipeline A 250, a fragmentation unit B 240, a received queue B 282, and a transmit queue B 284. Each of these elements may be implemented by hardware or by software or any combination of hardware and software.

The routing table 210 includes routing information for the packets. The information includes the packet source and destination identifiers, the packet types and lengths, and other control and status information. The routing control system 220 includes control information to control the fragmentation units A and B 230 and 240, and the refragmentation pipelines A and B 250 and 260.

The fragmentation unit A 230 includes a receive packet re-assembly A 232 and a transmit packet fragmentation A 234. The fragmentation unit A 230 performs the fragmentation and reassembly of the packets transmitted and received, respectively, over the frame relay network 130 (FIG. 1). The receive packet re-assembly A 232 re-assembles the packets as received from the receive queue A 272. The receive packet re-assembly A 232 includes a receive re-assembly buffer A 233 to store packets from the receive queue A 272. The receive queue A 272 provides a temporary storage for the packets arriving from the FRI A 122. The transmit packet fragmentation A 234 includes a transmit fragmentation buffer A 235 to store packets from the refragmentation pipeline B 260. The transmit packet fragmentation A 234 sends the packets to the transmit queue A 274. The transmit queue A 274 provides temporary storage for the packets sent to be sent to the FRI A 122.

The fragmentation unit B 240, the received queue B 282, and the transmit queue B 284 perform essentially the same functions as the corresponding elements in side A, except that the interface is the FRI B 124. The fragmentation unit B 240 includes a receive packet re-assembly B 242 and a transmit packet fragmentation B 244. The receive packet re-assembly B 242 includes a receive re-assembly buffer B 243 and the transmit packet fragmentation B 244 includes a transmit fragmentation buffer B 245.

The refragmentation pipeline A 250 and the refragmentation pipeline B 260 buffer the received packets from the fragmentation unit A 230 and the fragmentation unit B 240, respectively, in a pipeline fashion. The pipelined refragmentation reduces the transmission delay by retrieving the packets from the corresponding receive packet assembly as soon as the data exceeds the corresponding fragmentation sizes.

The RPA 115 can be implemented by hardware or software or a combination of hardware and software. The receive queue A 272 is a buffer memory such as random access memory (RAM's) or first in first out (FIFO). The received packet data are transferred to the receive packet fragmentation A 232 into the re-assembly buffer 233. The re-assembly buffer 233 is also implemented by either RAM or FIFO. A counter is used to determine the size of the data transferred to the re-assembly buffer. When the size of the data in the re-assembly buffer exceeds the corresponding fragmentation size as determined by the routing control system 220 from the routing table 210, the data are transferred from the re-assembly buffer A 233 to the refragmentation pipeline A 250.

The pipeline operation of the RPA 115 reduces delays of data transmission from a DLCI # N on the FRI A to a DLCI # K on the FRI B by overlapping the transfer of data from the receive re-assembly buffer A 233 to the refragmentation pipeline A 250 and the transfer of data from the receive queue A 272 to the receive re-assembly buffer A 233. Similarly, the pipeline operation of the RPA 115 reduces delays of data transmission from a DLCI # K on the FRI B to a DLCI # N on the FRI A by overlapping the transfer of data from the receive re-assembly buffer B 243 to the refragmentation pipeline B 260 and the transfer of data from the receive queue B 282 to the receive re-assembly buffer B 243. In this manner, the destination transmit packet fragmentation A 234 and transmit packet fragmentation B 244 receive packet data from the refragmentation pipeline A 250 and the refragmentation pipeline B 260, respectively, as soon as the packet data is equal to or exceeds the corresponding fragmentation sizes.

The basic operation of the RPA 115 includes preparation of packet data for the refragmentation pipeline and pipelining the packet data. The preparation of packet data ensures that the packet data are processed in a properly configured fragmentation system. The pipelining of the packet data performs the data transfer from the source fragmentation unit to the destination fragmentation unit in a pipeline manner.

Figure 3:
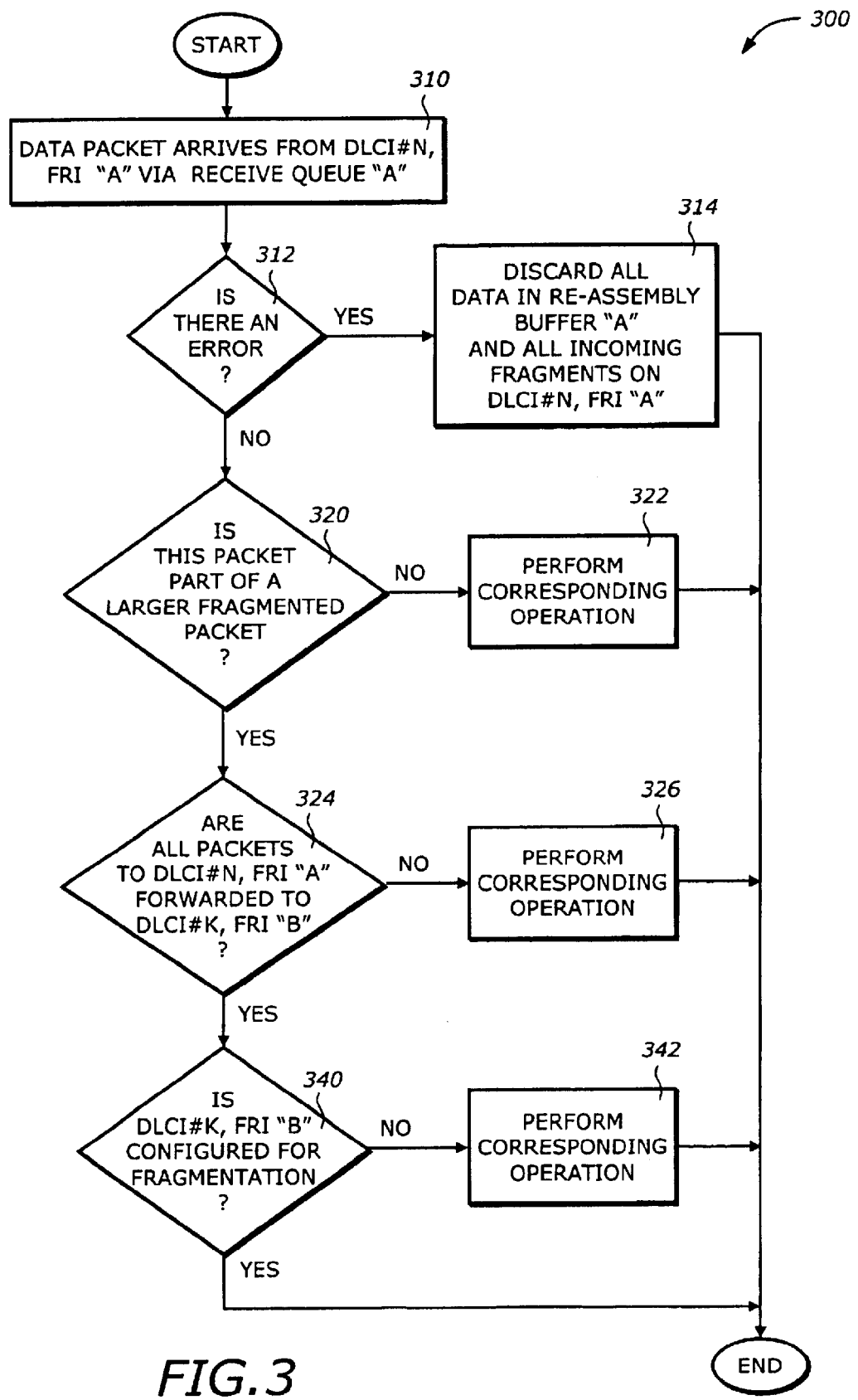
FIG. 3 is a flowchart showing a process to prepare the re-fragmentation pipeline.

FIG. 3 is a flowchart illustrating a process 300 to prepare the re-fragmentation pipeline according to one embodiment of the invention.

Upon START, the data packets arrive from the DLCI # N on the FRI A via the receive queue (Block 310). The process 300 determines if there is any error in the reception of the data (Block 312). If there is error, the process 300 discards all data in the re-assembly buffer A and all in-coming fragments from the DLCI #N on the FRI A (Block 314) and is then terminated. If there is no error, the process 300 determines if the received packet is part of a larger fragmented packet (Block 320).

If the received packet is not part of a larger fragmented packet, the process 300 performs the corresponding operation on the received packet (Block 322). The process 300 is then terminated. If the received packet is part of a larger fragmented packet, the process 300 determines if all packets from the DLCI # N on FRI A are to be forwarded to the DLCI # K on the FRI B (Block 324) by consulting the routing table. If not, the process 300 performs the corresponding operation on the packet (Block 326) and is then terminated. If all packets are to be forwarded to the DLCI # K on the FRI B, the process 300 determines if the DLCI # K on the FRI B is configured for fragmentation (Block 340). If not, the process 300 performs the corresponding operation (Block 342) and is then terminated. Otherwise, the process 300 is terminated and the preparation for refragmentation pipelining is complete.

Figure 4:
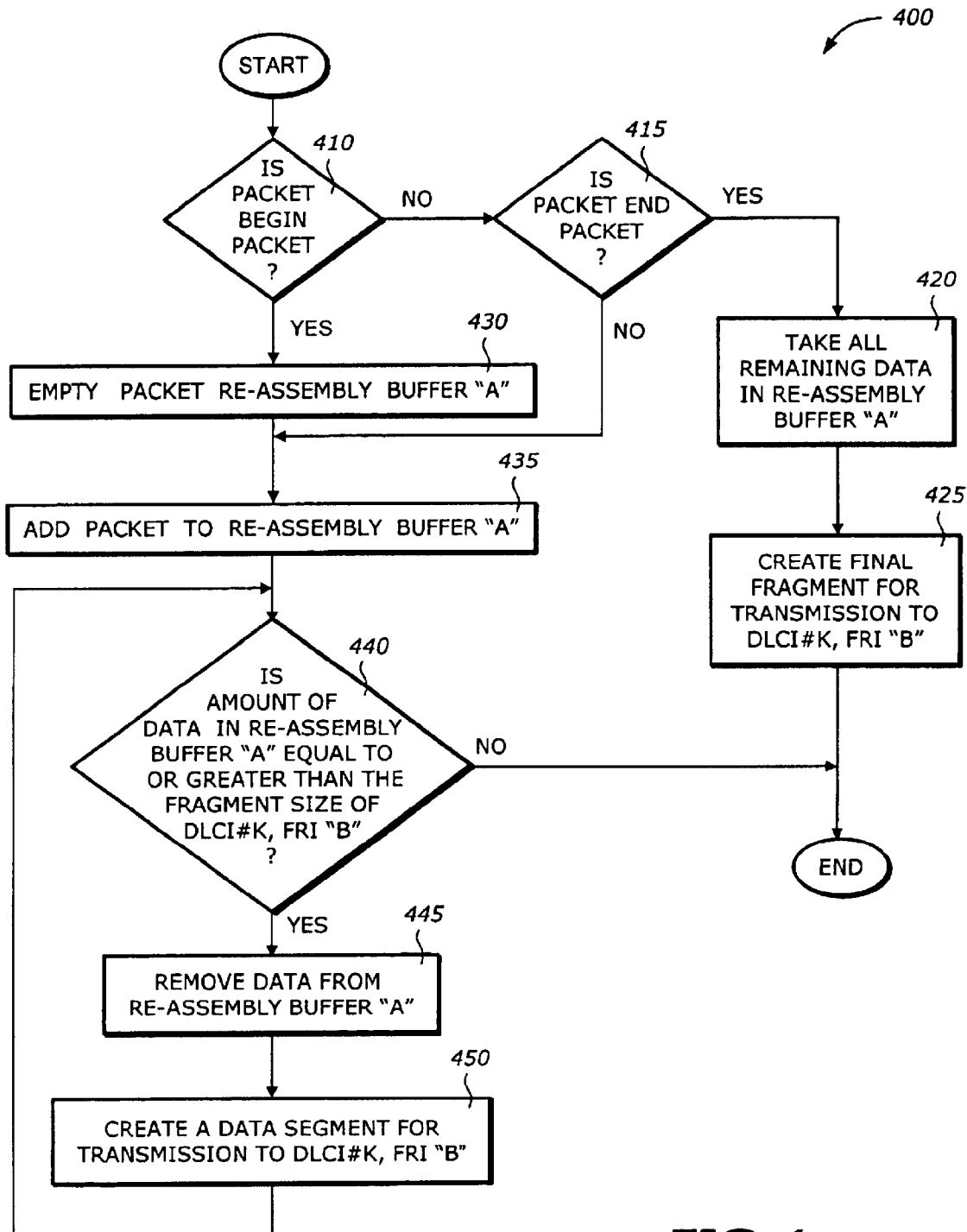
FIG. 4 is a flowchart showing a process to perform the re-fragmentation pipeline.

FIG. 4 is a flowchart illustrating a process 400 to perform the re-fragmentation pipeline according to one embodiment of the invention. The process 400 is essentially a continuation of the process 300.

Upon START, the process 400 determines if the received packet is a begin packet (Block 410) by checking the control bits (e.g., the "B" begin packet bit) in the FRF.12 fragmentation header. If not, the process 400 determines if the received packet is an end packet (Block 415) by checking the control bits (e.g., the "E" end packet bit) in the FRF.12 fragmentation header. If the received packet is an end packet, the process 400 takes all the remaining data in the receive queue A (Block 420). Then the process 400 creates a final fragment for transmission to the DLCI # K on FRI B (Block 425) and is then terminated. If the received packet is not an end packet, the process 400 proceeds to block 435 to add the received packet to the re-assembly buffer A.

If the received packet is a begin packet as determined from block 410, the process 400 empties the packet re-assembly buffer A to prepare accepting the packets (Block 430). Then the process 400 adds the received packet to the re-assembly buffer A (Block 435).

Then the process 400 determines if the amount of data in the re-assembly buffer A is greater than or equal to the fragment size of the DLCI #K on the FRI B (Block 440). If not, the process 400 is terminated to wait for the arrival of the next packet as processed by the process 300 shown in FIG. 3. Otherwise, the process 400 removes the data from the re-assembly buffer A (Block 445). Next, the process 400 creates a data segment for transmission to the DLCI # K on the FRI B (Block 450). Then the process 400 returns to block 440 to continue checking if additional data is to be removed from the re-assembly buffer A.

Thus, the present invention is a technique to reduce delay in a multi-hop frame relay network. The technique uses a pipeline process for the defragmentation and refragmentation of the received packets. The packet data are removed from the re-assembly buffer as soon as the accumulated data exceeds the corresponding fragment size. The technique provides fast processing of packet data and reduces delays.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method to reduce delay in a communication network, the method comprising:
   (a) receiving a packet from a first data link for transmission to a second data link; and
   (b) pipelining data of the received packet via a refragmentation pipeline, comprising:
      (b1) adding the received packet to a re-assembly buffer,
      (b2) removing data from the re-assembly buffer if an amount of data in the re-assembly buffer is equal to or greater than a fragment size of the second data link, and
      (b3) emptying the re-assembly buffer if the received packet is a begin packet.

2. The method of claim 1 wherein (a) comprises:
   (a1) storing the packet in a receive queue;
   (a2) determining if the received packet is forwarded to the second data link; and
   (a3) determining if the second data link is configured for fragmentation.

3. The method of claim 1 wherein (b) further comprises:
   (b4) creating a data segment for transmission to the second data link.

4. The method of claim 3 wherein (b) further comprises:
   (b5) creating a data segment for transmission using data remaining in the re-assembly buffer if the received packet is an end packet.

5. The method of claim 1 wherein (a) further comprises:
   (a4) discarding remaining data in the re-assembly buffer if there is an error in the received packet.

6. An apparatus to reduce delay in a communication network, the apparatus comprising:
   a fragmentation unit to re-assemble a packet received from a first data link, the fragmentation unit comprising a re-assembly buffer to store the received packet; and
   a refragmentation pipeline coupled to the fragmentation unit to pipeline the re-assembled data for transmission to a second data link; wherein the re-assembly buffer transfers data to the refragmentation pipeline if an amount of data in the re-assembly buffer is equal to or greater than a fragment size of the second data link, and is emptied if the received packet is a begin packet.

7. The apparatus of claim 6 further comprising:
   a receive queue coupled to the fragmentation unit to receive the packet.

8. The apparatus of claim 7 wherein the receive queue transfers the received packet to the re-assembly buffer.

9. The apparatus of claim 8 wherein the data in the re-assembly buffer is transferred to the refragmentation pipeline in overlap with the received packet being transferred from the receive queue to the re-assembly buffer.

10. The apparatus of claim 9 wherein the re-assembly buffer is emptied if the received packet is a begin packet.

11. The apparatus of claim 10 wherein a final segment for transmission to the second data link is created from data in the re-assembly buffer if the received packet is an end packet.

12. The apparatus of claim 9 wherein data in the re-assembly buffer is discarded if the received packet has an error.

13. A computer program product comprising:
   a computer usable medium having computer program code embodied therein for reducing delay in a communication network, the computer program product having:
      (a) computer readable program code for receiving a packet from a first data link for transmission to a second data link; and
      (b) computer readable program code for pipelining data of the received packet via a refragmentation pipeline, the computer readable program code for pipelining comprising:
         (b1) computer readable program code for adding the received packet to a re-assembly buffer,
         (b2) computer readable program code for removing data from the re-assembly buffer if an amount of data in the re-assembly buffer is equal to or greater than a fragment size of the second data link, (b3) computer readable program code for emptying the re-assembly buffer if the received packet is a begin packet.

14. The computer program product of claim 13 wherein (a) comprising:
   (a1) computer readable program code for storing the packet in a receive queue;
   (a2) computer readable program code for determining if the received packet is forwarded to the second data link; and
   (a3) computer readable program code for determining if the second data link is configured for fragmentation.

15. The computer program product of claim 13 wherein (b) further comprises:
   (b4) computer readable program code for creating a data segment for transmission to the second data link.

16. The computer program product of claim 15 wherein (b) further comprises:
   (b5) computer readable program code for creating a data segment for transmission using data remaining in the re-assembly buffer if the received packet is an end packet.

17. The computer program product of claim 16 wherein (a) further comprises:
   (a4) computer readable program code for discarding remaining data in the re-assembly buffer if there is an error in the received packet.

18. A system comprising:
   first and second network interfaces for receiving and transmitting data over a communication network via first and second data links, respectively;
   a processing unit coupled to the first and second network interfaces to reduce delay in data transmission in the communication network, the processing unit comprising:
   a fragmentation unit coupled to the first network interface to re-assemble a packet received from the first data link, the fragmentation unit comprising a re-assembly buffer to store the received packet, and
   a refragmentation pipeline coupled to the fragmentation unit to pipeline the re-assembled data for transmission to a second data link; wherein the re-assembly buffer transfers data to the refragmentation pipeline if an amount of data in the re-assembly buffer is equal to or greater than a fragment size of the second data link and is emptied if the received packet is a begin packet.

19. The system of claim 18 wherein the processing unit further comprises a receive queue coupled to the fragmentation unit to receive the packet.

20. The system of claim 19 wherein the receive queue transfers the received packet to the re-assembly buffer.

21. The system of claim 20 wherein the data in the re-assembly buffer is transferred to the refragmentation pipeline in overlap with the received packet being transferred from the receive queue to the re-assembly buffer.

22. The system of claim 21 wherein the re-assembly buffer is emptied if the received packet is a begin packet.

23. The system of claim 21 wherein a final segment for transmission to the second data link is created from data in the re-assembly buffer if the received packet is an end packet.

24. The system of claim 21 wherein data in the re-assembly buffer is discarded if the received packet has an error.

25. An apparatus to reduce delay in a communication network, the apparatus comprising:
   a fragmentation means to re-assemble a packet received from a first data link, the fragmentation means comprising a re-assembly buffer means to store the received packet; and
   a refragmentation pipeline means coupled to the fragmentation means to pipeline the re-assembled data for transmission to a second data link; wherein the re-assembly buffer means transfers data to the refragmentation pipeline means if an amount of data in the re-assembly buffer means is equal to or greater than a fragment size of the second data link and is emptied if the received packet is a begin packet.

26. The apparatus of claim 25 further comprising:
   a receive queue means coupled to the fragmentation means to receive the packet.

27. The apparatus of claim 26 wherein the receive queue means transfers the received packet to the re-assembly buffer.

28. The apparatus of claim 27 wherein the data in the re-assembly buffer means is transferred to the refragmentation pipeline means in overlap with the received packet being transferred from the receive queue means to the re-assembly buffer means.

29. The apparatus of claim 28 wherein the re-assembly buffer means is emptied if the received packet is a begin packet.

30. The apparatus of claim 29 wherein a final segment for transmission to the second data link is created from data in the re-assembly buffer means if the received packet is an end packet.

31. The apparatus of claim 28 wherein data in the re-assembly buffer means is discarded if the received packet has an error.

* * * * *